United States Patent [19]
Ramakrishnan et al.

[11] Patent Number: 6,085,215
[45] Date of Patent: Jul. 4, 2000

[54] SCHEDULING MECHANISM USING PREDETERMINED LIMITED EXECUTION TIME PROCESSING THREADS IN A COMMUNICATION NETWORK

[75] Inventors: Kadangode K. Ramakrishnan, Maynard; Dennis Ting, Groton; Lev Vaitzblit, Concord, all of Mass.

[73] Assignee: Cabletron Systems, Inc., Rochester, N.H.

[21] Appl. No.: 08/971,788

[22] Filed: Nov. 17, 1997

Related U.S. Application Data

[63] Continuation-in-part of application No. 08/037,962, Mar. 26, 1993, abandoned.

[51] Int. Cl.[7] ....................................................... G06F 9/46
[52] U.S. Cl. ........................................... 709/102; 709/166
[58] Field of Search ................................ 395/650; 713/1, 713/2, 100; 709/102, 106

[56] References Cited

U.S. PATENT DOCUMENTS

| | | | |
|---|---|---|---|
| 4,908,750 | 3/1990 | Jablow | 364/200 |
| 5,179,702 | 1/1993 | Spix et al. | 395/650 |
| 5,202,987 | 4/1993 | Bayer et al. | 395/650 |
| 5,210,872 | 5/1993 | Ferguson et al. | 395/650 |
| 5,247,675 | 9/1993 | Farrell et al. | 395/650 |
| 5,257,372 | 10/1993 | Furtney et al. | 395/650 |
| 5,272,697 | 12/1993 | Fraser et al. | 370/61 |
| 5,287,508 | 2/1994 | Hejna, Jr. et al. | 395/650 |
| 5,325,525 | 6/1994 | Shaw et al. | 395/650 |
| 5,339,415 | 8/1994 | Strout, II et al. | 395/650 |
| 5,386,561 | 1/1995 | Huynh et al. | 395/650 |

FOREIGN PATENT DOCUMENTS

0527392A2  7/1992  European Pat. Off.  .......... G06F 9/46

OTHER PUBLICATIONS

Mercer et al, preemptibility in real–time systems, IEEE 1992.

Tokuda et al, Real–time Mach towards a predictable real time system, proceedings of the USENIX mach workshop, Oct. 1990.

"Real–Time Mach: Toward a Predictable Real–Time System" Confer. Title: USENIX Workshop Proceedings. Mach, Date Oct. 1990, Berkeley CA, USA.

(List continued on next page.)

*Primary Examiner*—Majid A. Banankhah
*Attorney, Agent, or Firm*—Wolf, Greenfield & Sacks, P.C.

[57] ABSTRACT

Method and apparatus for avoiding receive livelock and transmit starvation, and for minimizing packet loss and latency in a communication network station. The invention uses a combination of processing threads, polling and, in a preferred embodiment, a judicious use of interrupts, to allocate the use of processing resources fairly among competing functions. Real time processing threads are structured to execute for a preselected maximum time interval, based on numbers of units processed by each thread, and then to yield control to a thread scheduler, which selects and invokes a new thread for execution. Work to be done in the various threads is determined either by polling or by an interrupt system, and then posted to the threads for execution. If interrupts are used, interrupt service routines perform only the minimal processing needed to recognize an interrupt, other interrupt servicing functions being deferred for execution in a processing thread. The thread scheduler operates on a round-robin basis and also selects from at least one general purpose processing thread for functions that are less time critical, the general purpose thread being structured to operate for a selected minimum time, if needed, in a non-preemptable mode, and thereafter in a preemptable mode.

21 Claims, 3 Drawing Sheets

OTHER PUBLICATIONS

K.K. Ramakrishnan, "Performance Considerations in Designing Network Interfaces," *IEEE Journal on Selected Areas in Communications*, vol. 11, No. 2, Feb. 1993, pp. 203–219.

K.K. Ramakrishnan et al., "Operating System Support for a Video–On–Denmand File Service," ©Springer–Verlag Berlin Heidelberg, 1994, pp. 216–227.

Karsten Schwan et al., "Multiprocessor Real–Time Threads," *Operating Systems Review (SIGOPS)*, Jan. 26, 1992, No. 1, New York, USA, pp. 54–65.

Frederick Clegg et al., "The HP–UX Operating system on HP Precision Architecture Computers," *Hewlett–Packard Journal*, (1986) Dec., No. 12, Palo Alto, California, USA, pp. 4–22.

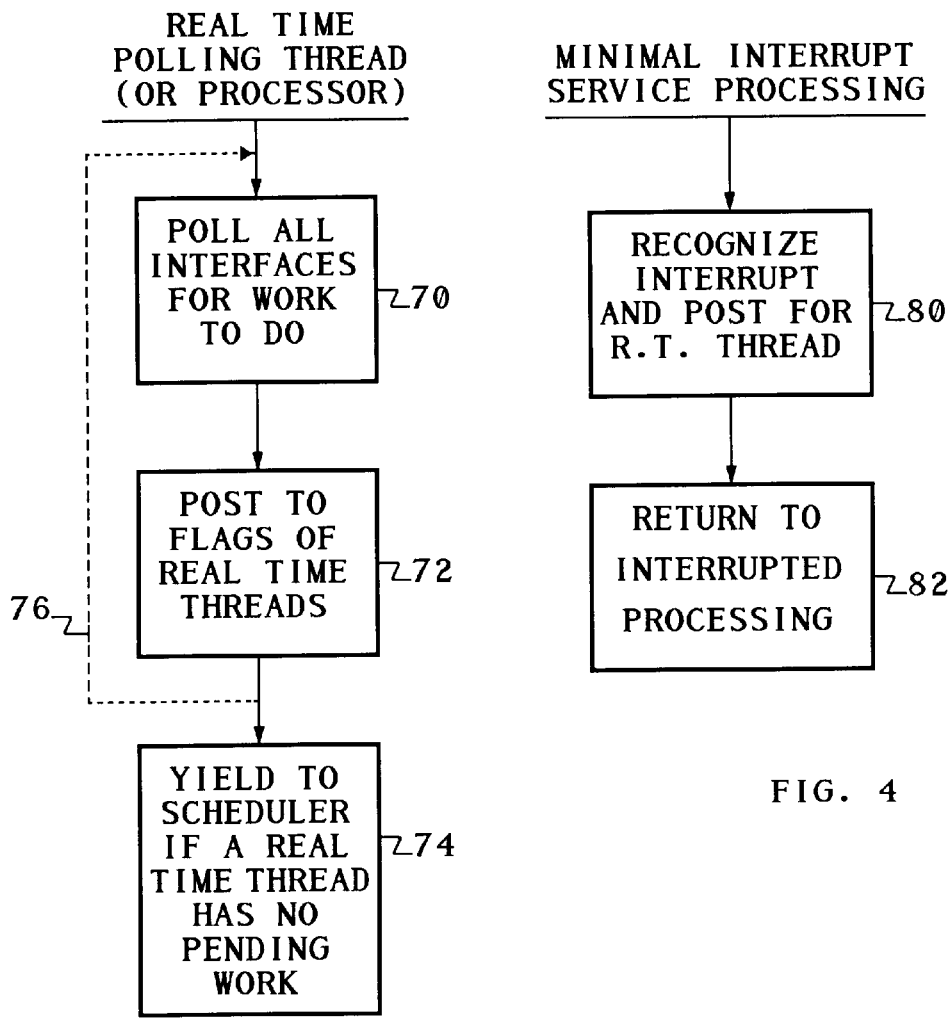
FIG. 3
FIG. 4
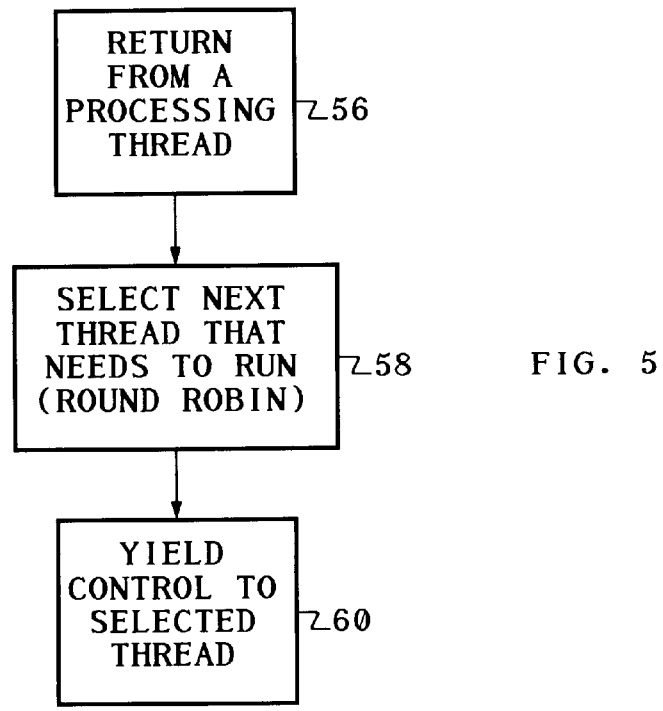
FIG. 5

SCHEDULING MECHANISM USING PREDETERMINED LIMITED EXECUTION TIME PROCESSING THREADS IN A COMMUNICATION NETWORK

This application is a CIP of Ser. No. 08/037,962 filed Mar. 26, 1993 ABN.

BACKGROUND OF THE INVENTION

This invention relates generally to the efficient design and operation of communication networks and, more particularly, to scheduling mechanisms for use in stations connected to a communication network. A network consists of a communication channel, and a number of stations connected to the channel. Information is transmitted over the channel in data frames or packets, the packets having headers that permit each station to determine the destination of the data.

Each station has to perform a number of tasks and subtasks related to sending and receiving data packets. In general, these tasks and subtasks may overlap in time, and the performance of any one of them may be dependent on the completion of another. Moreover, the functions performed in a station, whether dependent or independent, typically have relative priorities. Since a station may comprise only one processor for performing all of the station tasks and subtasks, scheduling these tasks and subtasks at the station is a critical aspect of network operations. Scheduling in the end-system has to meet the requirements expected by the network: the network protocols, the rules for accessing the channel, and so forth, primarily in terms of throughput and latency.

As computer networks have developed, various approaches have been used in the choice of communication medium, network topology, message format, and protocols for channel access. Some of these approaches have emerged as standards, and a model for network architectures has been proposed and widely accepted. It is known as the International Standards Organization (ISO) Open Systems Interconnection (OSI) reference model. The OSI reference model is not itself a network architecture. Rather it specifies a hierarchy of protocol layers and defines the function of each layer in the network. Each layer in one computer of the network carries on a conversation with the corresponding layer in another computer with which communication is taking place, in accordance with a protocol defining the rules of this communication. In reality, information is transferred down from layer to layer in one computer, then through the channel medium and back up the successive layers of the other computer. However, for purposes of design of the various layers and understanding their functions, it is easier to consider each of the layers as communicating with its counterpart at the same level on the remote machine. However, of interest in the present invention are the data flowing from one layer to the next on the same machine, and the scheduling of activities of each of these layers in the same machine.

The lowest layer defined by the OSI model is called the physical layer, and is concerned with transmitting raw data bits over the communication channel, and making sure that the data bits are received without error. Design of the physical layer involves issues of electrical, mechanical or optical engineering, depending on the medium used for the communication channel. The layer next to the physical layer is called the data link layer. The main task of the data link layer is to transform the physical layer, which interfaces directly with the channel medium, into a communication link that provides communication services to the next layer above, known as the network layer. The data link layer performs such functions as structuring data into packets or frames, and attaching control information to the packets or frames, such as checksums for error detection, and packet numbers.

Although the data link layer is primarily independent of the nature of the physical transmission medium, certain aspects of the data link layer function are more dependent on the transmission medium. For this reason, the data link layer in some network architectures is divided into two sublayers: a logical link control sublayer, which performs all medium-independent functions of the data link layer, and a media access control (MAC) layer. This layer, or sublayer, determines which station should get access to the communication channel when there is competition for it. The functions of the MAC layer are more likely to be dependent on the nature of the transmission medium.

From this background, it will be appreciated that each station must perform a number of housekeeping tasks on a continuing basis to ensure efficient operation of the station and the network. Packets of data received from the network have to be promptly processed to avoid or minimize loss of received packets. Processing includes not only delivering the packets to a station memory, but transferring the packets from the lowest protocol layer through various higher layers. Packets of data for transmission onto the network have to be processed also, i.e. transferred through the protocol layers and eventually transmitted onto the network. Processing of data packets may also include examining and modifying packet headers. In addition, there may be a number of other types of functions that the station has to perform, depending on the activities for which the station is designed. For example, a station may be a file server for the network, handling mass storage devices and to which other stations have access through the file server. Or the station may be a terminal or workstation through which a user accesses the network. In summary, each station has to process receive packets and transmit packets, and may have to perform a number of other tasks.

Some of the station functions are typically performed in a station adapter, a device that provides an interface between the network communication channel and a host system bus of the station. The adapter contains a packet buffer memory in which receive packets are temporarily stored before transfer to a host system memory, also connected to the bus, and in which transmit packets are temporarily stored after retrieval from the host system memory and before being transmitted onto the network. The adapter may have its own processor, or may use a hardware state machine to handle some of its functions. Other station functions may be performed by the host processor itself. Regardless of where in the station the various processing functions are performed, there is almost always a problem of scheduling these functions in an appropriately efficient way. The problem is simply a matter of how to allocate processing resources fairly. If a station were to be provided with abundant processing resources, there would by no significant scheduling problem. Normally, however, there is a cost constraint that keeps processing resources small, and the scheduling problem usually reduces to a question of allocating a single processor to handle multiple tasks as efficiently as possible.

Typically, scheduling mechanisms in a network station processor or adapter processor are interrupt driven, which simply means that the processor is interrupted from time to time by events as they transpire. For example, when a receive packet must be read from the network communication channel, a hardware interrupt is generated and preempts whatever is currently taking place, in favor of the usually more important receive packet processing. An interrupted processor must save the context of its current processing task, determine the cause of the interrupt, switch to a new task, and later return to the interrupted task after restoring the context at the time of the interrupt. Scheduling is often more complex in a host processor, which, in addition to communication functions, has to attend to such activities as disk input/output, file service, and application protocol processing.

An interrupt driven scheduling mechanism has assigned interrupt priorities, which are usually fixed. In most systems, the highest priority is accorded to receiving packets at the lowest network protocol layer. Then, the network protocol layers at the next higher levels get priority to process the received packet. When these tasks give up control, the lowest layers of packet transmission activity get priority. Some of these packet reception and transmission tasks may be non-interruptable, which is to say they must run to some point of completion or partial completion before another task obtains control. Often, they run to completion, which involves processing multiple packets received in a burst.

There are four related problems that should be avoided or minimized in any network station scheduling mechanism: receive livelock, transmit starvation, unacceptable packet loss, and unacceptable latency for delivery of a first packet in long burst of received packets. Receive livelock is a condition that arises when a system is so preoccupied with fielding receive interrupts that it is unable to complete the process to deliver the packets to the application, which is the final recipient. Stated another way, when the processing and delivery of receive packets takes longer than the time between receipt of successive packets, then the processor can only complete processing packets at lower network layers, and does not make sufficient progress at the higher layer. Receive livelock usually results in the next mentioned problem, transmit starvation. A typical scheduling approach provides receive processing higher priority, allows receives to interrupt other activity, and allows receive processing to run to completion before starting another task. In a system employing this approach, progress in processing transmit packets is assured only when the packet reception process is complete. Thus, in a receive livelock condition, or even when the processor is only relatively busy processing receive packets, the tasks relating to transmits, and also to higher layer processing, will be starved of processing resources.

Interrupt driven, non-preemptable processing of receives at the lowest network layers also adds latency to delivery of packets to their ultimate destination, and can introduce excessive packet loss. Latency to deliver the packet to the application in interrupt driven systems arises because of the processing overhead needed to service an interrupt and to save the context of processing already in progress. In addition, because of priority for this interrupt, the higher layers do not make timely progress as they do not get a fair share of processing resources, and latency to deliver the packet further increases. Packet loss results when receive livelock is advanced to the state that no progress is being made in processing packets already received, and newly arriving packets have to be dropped for lack of buffers to queue these packets to the next higher layer.

It will be appreciated from the foregoing that there is still a significant need for improvement in scheduling mechanisms for communication functions of a network station operating system. Scheduling mechanisms are needed both in the host system processing unit and in the processor of the adapter that connects the host to the network. In particular, what is needed is a scheduling approach that addresses all of the problems discussed above. The present invention satisfies this need.

SUMMARY OF THE INVENTION

The present invention resides in a novel scheduling method and apparatus for use in stations of a communication network. The invention practically eliminates receive livelock and transmit starvation, improves performance in terms of packet loss and latency and induces a greater degree of fairness in allocating processing resources to various tasks.

Briefly, and in general terms, the method of the invention comprises the steps of dividing processing tasks into processing threads, each of which is structured to execute for a limited time before being subject to preemption by another processing thread; repeatedly determining when work is to be done by any of the processing threads; repeatedly posting any work to be done to appropriate ones of the processing threads; selecting a processing thread that has work to be done; invoking the selected processing thread; and executing the selected and invoked processing thread. Most of the threads are categorized as real time threads, which execute for up to the selected maximum time before yielding control. A measure of the maximum execution time in a thread is obtained by counting up to a selected number of units processed by the thread. The method continues by repeating the selecting, invoking and executing steps for other processing threads.

The maximum number of units processed by a real time thread each time it is invoked is referred to as the "weight" of the thread. Associating different weights with different real time threads allows for favoring one activity over another.

In one embodiment of the invention, the step of determining when work is to be done by any of the processing threads includes polling all of the processing tasks. An alternative approach includes enabling interrupts for higher priority tasks, which temporarily preempt other processing. When interrupts are used, the method includes servicing the interrupts as rapidly as possible. Furthermore, the number of such interrupts allowed in any unit of time is strictly controlled, by potentially disabling the interrupts when a predefined limit of number of interrupts in an interval is exceeded. Time consuming interrupt servicing functions are deferred for execution in processing threads, where they must compete with the other threads for processing resources.

In accordance with one aspect of the invention, the step of dividing the processing tasks into processing threads includes establishing real time processing threads, for execution of time-critical functions, each real time processing thread being structured to execute for a time determined by a maximum number of processed units; and establishing at least one general purpose processing thread, for execution of functions that are less bounded in terms of execution time. Each general purpose processing thread is structured to execute for a preselected minimum time, if needed, during which it is non-preemptable by other threads, and to execute thereafter, if needed, in a preemptable mode. During the time it is non-preemptable, a general purpose thread is like a real time thread. This may be in order to guarantee some processing for general purpose tasks, such as for applications, so that they make progress. When a general purpose thread has to perform a real time task related function (e.g., transmit a packet), it may queue the packet to a real time thread.

The step of selecting a thread for execution includes selecting from the threads that have work posted, on a round-robin basis. Invoking the selected thread includes switching the context of processing from the previously executing thread to the selected thread, and transferring processing control to the selected thread. Thread selection is made in the presently preferred embodiment on a round-robin basis, i.e. each thread is considered for execution in turn, including the general purpose thread or threads. If a thread has no work posted, i.e. is not needed at the present time, the selection process checks the next thread in turn.

In the presently preferred embodiment of the invention, the step of posting any work to be done to appropriate processing threads includes setting or posting a flag for each processing thread that has work to be done. This flag is set when an interrupt is encountered, but no other work is done for the interrupt. Also, unless the flag is reset, that particular interrupt may not be re-enabled. The work is queued anyway in the adapter or driver buffers.

In accordance with another aspect of the invention, the method may also include limiting the rate at which interrupts can be serviced, by temporarily disabling interrupts from time to time. This places a limitation on the priority inherent in interrupt processing, or lack of control inherent in priority driven interrupt-based processing.

The invention may also be expressed in terms of novel apparatus, for scheduling multiple processing tasks for improved performance in a network communication station. The apparatus comprises a set of executable processing threads, including real time processing threads structured to execute for a selected maximum time determined by counting a selected number of processed units, and at least one general purpose processing thread structured to execute in a non-preemptable mode for a selected minimum time, if needed, and to execute thereafter, if needed, in a preemptable mode. Two other necessary elements of the apparatus are a thread posting mechanism, including means for repeatedly determining when work is to be done by any of the processing threads, and means for repeatedly posting any work to be done to appropriate ones of the processing threads; and a thread scheduler, for selecting and invoking processing threads that have work to be done.

The thread posting mechanism may include either means for polling all of the processing tasks, or an interrupt system capable of temporarily preempting processing when a processing task has work to be done. The interrupt system uses minimal interrupt servicing means, for processing interrupts as rapidly as possible, so that the more time consuming interrupt servicing functions are deferred for execution in processing threads.

The thread scheduler of the apparatus includes means for selecting from the real time and general purpose threads that have work posted, on a round-robin basis; and means for invoking the selected thread by switching the context of processing from the previously executing thread to the selected thread, and transferring processing control to the selected thread. In the illustrative embodiment of the invention, the means for repeatedly posting any work to be done to appropriate processing threads includes means for setting or posting a flag for each processing thread that has work to be done. As discussed above, each thread has a weight associated with it; and the weight is used to determine the time spent in the thread before relinquishing control to another thread.

Before entering a real time thread, the scheduler automatically clears the flag that indicated work needed to be done by that thread. The real time service routine that causes posting of the flag indicating work is pending has to check to determine if there is work actually pending to be processed, since it is possible that the work of the corresponding interrupt was already done during the previous invocation of the real time thread.

It will be appreciated from the foregoing that the present invention represents a significant advance in scheduling mechanisms for use in communication network station processors, including host processors and processors in network adapters. Other aspects of the invention will become apparent from the following more detailed description, taken in conjunction with the accompanying drawings.

BRIEF DESCRIPTION OF THE DRAWINGS

FIG. 3 is a flow chart showing the functions of a real time polling thread or a real time processor for the same purpose;

FIG. 4 is a flowchart showing the functions of a minimal interrupt service processing routine; and FIG. 5 is a flowchart showing the functions of a core thread scheduler appearing in FIG. 2.

DESCRIPTION OF THE PREFERRED EMBODIMENT

Figure 1:
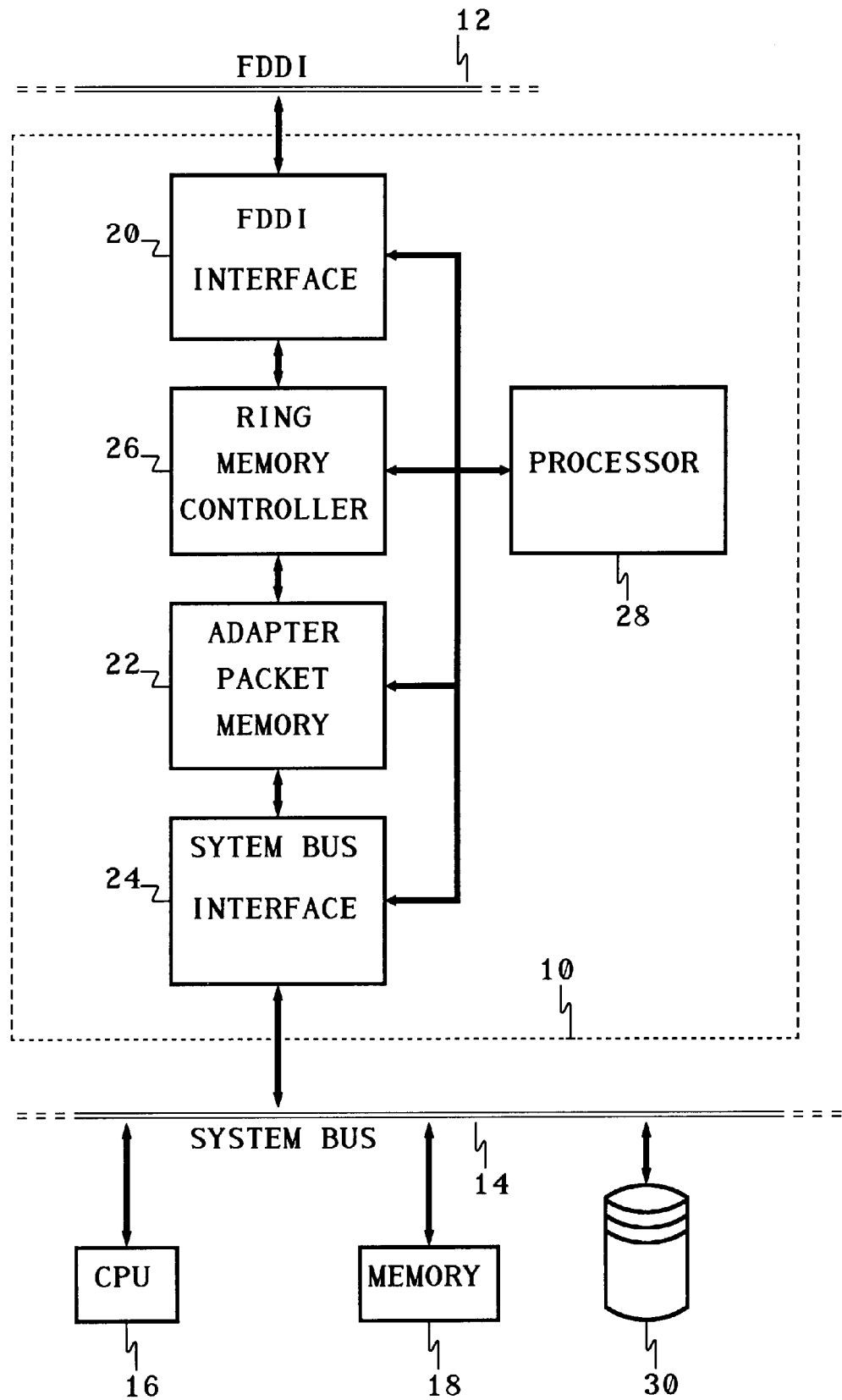
FIG. 1 is a block diagram showing a network station connected to a communication network through an adapter.

As shown in the drawings for purposes of illustration, the present invention is concerned with operating system scheduling mechanisms for use in communication network stations. Although the mechanism of the invention is applicable to various types of network protocols, it will be described for purposes of illustration in relation to a token ring network, such as one following the fiber distributed data interface (FDDI) protocols.

A typical network station configuration is shown in FIG. 1, and includes a network adapter, indicated by reference numeral 10, connected between a token ring network 12, indicated as being of the fiber distributed data interface (FDDI) type, and a system bus 14. The system bus 14 has connected to it a central processing unit (CPU) 16 and a system memory 18. The adapter 10 processes data packets received from the network 12 and stores them in the system memory 18 for subsequent processing by the CPU 16.

The adapter 10 includes an FDDI interface 20, a packet memory 22, a system bus interface 24, a packet memory controller 26 and an adapter processor 28. Received data packets are stored temporarily in the packet memory 22 and later delivered to the system memory 18 under control of the adapter processor 28. The rate at which received packets must be accepted from the network 12 is beyond the control of the adapter, and traditionally operation of the processor 28 is scheduled on an interrupt driven basis, to ensure that priority is given to processing the receive traffic. In this example, the CPU 16 performs a file server function, which means that it stores and retrieves data in a large mass storage device, such as a hard disk 30, and performs this function for multiple user stations (not shown) connected to the network 12.

The principles of the present invention apply to scheduling problems encountered both in the adapter processor 28 and in the host CPU 16. The network adapter 10 processes receive packets by placing them in the system memory 18. Thereafter, the CPU 16 is involved in receive packet processing at various network levels, and is also involved in transmit packet processing, eventually placing transmit packets in the system memory, for retrieval and transmission by the network adapter 10. Moreover, it will be appreciated that the division of receive processing and transmit processing tasks between the adapter 10 and the CPU 16 is one that may be made in a number of ways. The adapter functions could be performed by the CPU 16, but in most cases a separate adapter makes more sense, since the adapter functions are very much dependent on the communication channel. The CPU 16 in addition may be involved in executing file server functions. In any event, both the adapter processor 28 and the CPU 16 perform receive processing and transmit processing at some level, as well as other types of background processing required by the station. Therefore, similar priority considerations apply both to the adapter processor 28 and to the CPU 16.

As discussed in the background section of this specification, priority of processing in network stations is typically determined by a system of hardware interrupts, the priorities of which are fixed and in favor of receive packet processing. In some situations, it may not be possible to avoid an interrupt-based solution, because of constraints imposed by the processor operating system, or for other reasons. However, even in an interrupt-based scheduling mechanism, it is possible and desirable to limit the rate at which interrupts are accepted. One solution is to size the number of receive packet queue entries provided at the interface between the datalink layer and the network layer. A receive livelock may then be avoided by disabling interrupts for a short period of time, during which processing at higher layers (e.g., the network layer) makes progress and eventually frees up buffers for the lower levels (e.g., the datalink layer), so that interrupts can then be re-enabled. To avoid receive livelocks, to reduce latency, and for fairness in allocating processing resources, interrupt processing is modified to keep the work done in interrupt service routines to an extremely small amount. The remainder of servicing work required for that task is performed at a lower priority, where there will be competition with other activity, and therefore a higher degree of fairness among the competing tasks. Even transmit packet processing can compete more fairly for access to processing resources if the interrupt service routines are shortened as much as possible. Even with these improvements, however, an interrupt-based scheduling mechanism still does not guarantee fair access to processing resources by all processing tasks, unless other enhancements to the scheduler are implemented.

An alternative to interrupt-based scheduling is a polling approach, in which a packet processing driver "listens" for packets to be transmitted and received, and therefore can control the amount of processing at lower layers, as well as ensure some level of fairness between transmission and reception of packets. A disadvantage is that there may be an increased latency in processing a packet due to the polling delay. However, the overall performance and average latency may be improved with a polling structure because of the better control of processing at the lower levels, particularly when the system is heavily loaded. A properly designed polling structure can control the amount of time that each layer or sublayer executes before yielding to another task, and can control the maximum latency that a received request encounters.

Another advantage of polling over an interrupt-based mechanism is encountered in faster systems. The relative overhead for interrupt processing increases as systems get faster because, for a given increase in processor speed, the amount of time to execute an interrupt service routine (including hardware latencies, which are often the ones that do not speed up) does not decrease as much as the time to execute a typical instruction sequence. In addition, if faster RISC (reduced instruction set) machines are used, many more registers have to be saved and restored when interrupts are processed, so the overhead in context switching increases substantially.

The invention described here attempts to use the features of both these scheduling approaches to provide superior scheduling mechanisms for supporting communications tasks. In accordance with the present invention, real time processing tasks are predefined as being made up of a number of real time processing "threads," each of which is scheduled as needed and runs to a final or intermediate completion point without interruption or preemption. The most important aspect of a thread is that it is defined to run for a limited time before yielding control to a thread scheduler, but for performance and convenience the limited time is not measured by a timer interrupt. Rather, each thread is defined to process a selected number of units of work, such as packets, and this number of units has been calculated to be equivalent to a desired run time for the thread. Calculation of the number of units to process, or the "weight" of the thread, is based on throughput requirements relative to the other threads, and possibly on latency considerations. Alternatively, a fine granularity clock could be used to control the thread scheduler, at the expense of clock interrupt processing overhead. The scheduling mechanism has three basic components: a set of predefined processing threads, a thread posting mechanism, which determines what work is to be done and "posts" the work to the appropriate thread or threads, and a core thread scheduler, which determines which thread will next obtain access to processing resources.

Figure 2:
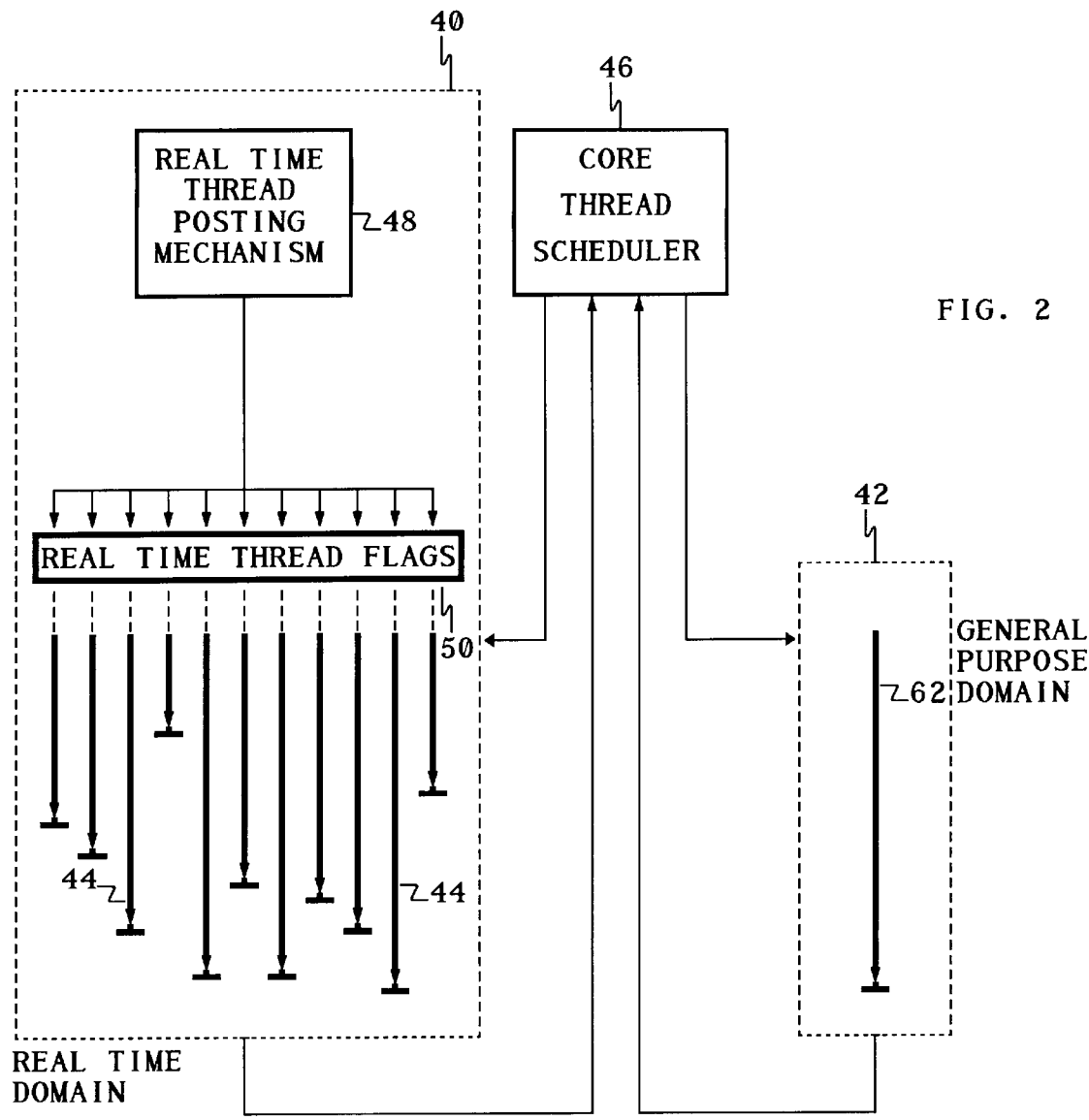
FIG. 2 is a block diagram depicting the principles of the scheduling mechanism of the present invention.
Figure 2A:
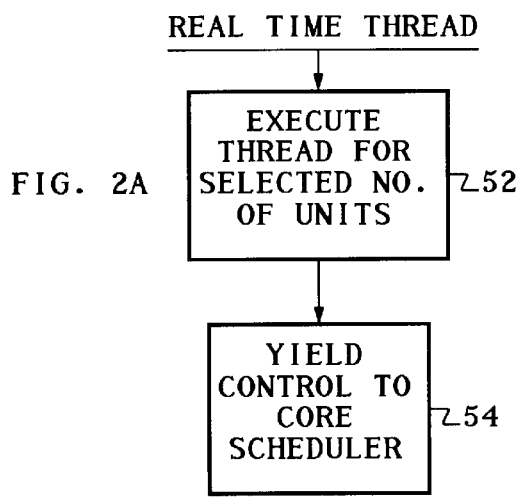
FIGS. 2A and 2B depict a real time processing thread and a general purpose processing thread, respectively.
Figure 2B:
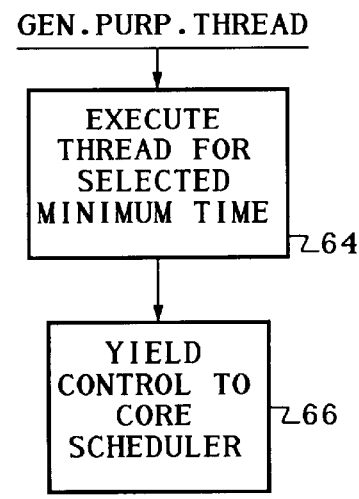

The thread scheduling mechanism is shown diagrammatically in FIGS. 2, 2A and 2B. As shown in FIG. 2, the mechanism is divided into a real time domain 40 and a general purpose domain 42. The real time domain includes a set of real time processing threads 44, each of which performs a limited amount of processing for a certain task, such as processing receive packets between one layer and another. Each real time thread 44 is non-interruptable for the period that it operates, and its period of operation is predetermined by permitting only a selected number of units to be processed. For example, in processing receive packets a thread may be constrained to process a selected number of packets before relinquishing control to a core thread scheduler 46.

Within the real time domain, there is also a real time thread posting mechanism 48, the specifics of which will be further described below. The function of the posting mechanism 48 is to determine whether any work needs to be done by the various threads, and to "post" the work to the appropriate threads. One way to do this is for the posting mechanism 48 to set real time thread flags 50, which are used to determine whether the threads 44 should be executed or not.

FIG. 2A illustrates in general the steps performed by a real time thread. As shown in block 52, the thread is executed to process a preselected maximum number of units, such as packets of data. Then, as shown in block 54, control is yielded to the core thread scheduler 46. When one of the threads 44 completes execution because it has processed the required maximum number of units, the thread sets its own thread flag 50 to ensure that a return will be made to continue processing in this thread on the next round robin schedule selection of this thread. If processing in the thread runs to completion, and not because the maximum number of units has been processed, the thread flag is not set, and the thread scheduler transfers processing resources to another thread.

The core thread scheduler 46 is a special task to which control is transferred at the end of each processing thread. The scheduler is simply a round-robin selection device with knowledge of all of the processing threads and access to the real time thread flags 50. When one processing thread is completed, the scheduler 46 chooses the next one in turn having a flag set to indicate that processing is needed. FIG. 5 shows the basic steps performed by the core thread scheduler 46. After return from a completed processing thread, indicated at 56, the scheduler 46 selects the next thread that needs to run (block 58), and yields control to the next thread (block 60). The scheduler 46 includes at least one time slot in its round robin system for the general purpose domain 42.

The real time domain 40 includes threads 44 involved with packet reception and transmission, and some file server tasks, such as processing disk storage access requests that can be satisfied without waiting for access to the disk 30 itself. This assumes that the disk 30 has an associated cache memory (not shown), in which frequently used data segments from the disk are stored. In many instances, requests for reading disk data can be satisfied by reading data from the disk cache. Similarly, a cache memory can be used for disk write requests, and many requests to store data on the disk can be satisfied by writing to the cache memory; then later writing the cache memory to the disk when time is available. Thus, any disk reading and writing operations only involving a cache memory can be included as real time threads, since they take relatively little time to execute. File server functions that require disk access, to read data not already in a read cache memory, or to write data to the disk from a write cache memory, are performed in the general purpose domain 42, which includes activities that are, in general, "unbounded" in terms of the time that they take to execute.

For fairness of resource allocation, the general purpose domain 42 is given at least one time slot in the round-robin allocation scheme used by the core thread scheduler 46. The general purpose domain 42 is depicted as having a single thread 62, but it will be understood that there may be multiple general purpose threads and that the general purpose domain may have to include its own scheduler to allocate processing time among these multiple threads.

The general purpose thread 62 is executed for a preselected minimum time, as indicated in block 64, and then yields control to the core scheduler 46, as indicated in block 66. When the general purpose thread 62 is initiated, the current minimum requirements of all of the general purpose domain activities are considered, and the minimum thread execution time is computed based on these requirements. After the minimum execution time, the general purpose thread 62 may continue to run, but may be preempted when any work arrives for a real time processing thread. The general purpose domain thread 62 may have its minimum execution time determined by a number of units processed, or may use a timer interrupt to end its minimum execution time. After the general purpose thread 62 enters its preemptable stage, preemption may be by way of a hardware interrupt, or a periodic timer interrupt that checks to determine whether any real time tasks are pending, or by way of polling initiated from the general purpose domain 42 for any real time tasks.

The real time posting mechanism 48 may take either of two forms: a polling technique or by a limited use of interrupts. The polling approach requires that a separate real time thread be used to check all the station interfaces for work to be performed by the processing threads 44. The polling thread may be given special priority in the core thread scheduler 46. The approach is depicted in FIG. 3, and includes the steps of polling all interfaces for work to be done by the real time threads, as shown in block 70, and then posting any work to the threads by setting appropriate real time thread flags 50, as shown in block 72. If the posting mechanism is a processing thread (and not a dedicated processor), the mechanism then yields control to the thread scheduler 46, as shown in block 74. A dedicated processor performing the polling task can merely keep looping through the steps, as shown by the broken line 76.

This polling approach is often suitable if there is an abundance of processing resources, or if a separate processor can be dedicated to the polling task. In a more resource limited single-processor system, use of a polling thread to post work to the real time processing threads may introduce latency in the reception of a request, especially if there are many real time items to be polled and if the general purpose domain is active. The latency can be reduced by polling more often (giving the polling thread higher priority in the thread scheduler) but doing so also increases overhead usage of the processing resources.

A more attractive technique of real time thread posting is presently preferred, and that is to make judicious use of interrupts. Each real time interrupt performs only the minimum action needed to recognize the interrupt and to post the work to be done to an appropriate real time thread, as indicated in block 80 (FIG. 4). Then the interrupt service routine returns control to the interrupted processing, as indicated in block 82. Use of an interrupt to record critical real time events, such as the receipt of a packet, keeps latency low, since there is no polling delay. Since these interrupt service routines perform minimum actions, we do not have a lot of context (i.e., registers) to be saved and restored. Therefore, the context switching overhead has minimal impact on latency. Once the interrupt is recognized, processing continues in an orderly fashion, using the scheme of processing threads controlled by the core scheduler.

The execution time or "weight" allocated to each real time thread, in terms of the number of processed units, depends on two factors. The first factor is the throughput requirements for the real time processing thread. For example, a real time processing thread interfacing a higher bandwidth link, such as the FDDI network, may have a larger weight than a real time thread interfacing a slower speed link, such as Ethernet. The second factor influencing the choice of weights the real time thread is the latency requirement of the threads. Taking this second factor into account is, at the present stage of development, more elusive. Clearly, deadline scheduling for the various threads should play a role in the overall schedule, but at present the choice of thread weights to optimize a complex system is still largely a matter of intuitive adjustment of these values. The following paragraphs discuss some specific examples of how to calculate weights for real time threads.

If the threads can be defined to have desired throughputs, and latency is not a consideration, the thread weights may be calculated as proportional to the throughputs. That is, the weight for thread i is calculated as being proportional to the desired throughput of thread i divided the sum of the desired throughputs of all of the real time threads. The desired throughput may be normalized to some nominal throughput, such as that for the slowest network link. For example, if there are three threads (for Ethernet driver/protocol processing, FDDI processing, and disk subsystem processing) with relative throughputs of 1, 10 and 5, then the weights may be chosen as 1/16, 10/16 and 5/16, respectively. If the scheduler has 16 time slots in a full cycle of its operation, the real time threads will be allocated 1, 10 and 5 time slots, respectively. If the processing capacity of the entire system is known, for example in packets per second, then the number of packets processed per unit time in each thread can also be calculated. If the system capacity is C packets/second, the weights may be chosen proportionately as $C*1/16$, $C*10/16$ and $C*5/16$.

If protocol processing is performed as a common thread for both Ethernet and FDDI, this would add a fourth thread to the example. Assuming that the protocol processing thread has a relative throughput of 11 units of throughput produced by Ethernet and FDDI together, the weights of the four threads are 1/27, 10/27, 5/27 and 11/27.

Continuing with this example, it is assumed that there is a need to meet "soft" real time processing requirements (in terms of meeting a deadline for executing a task). In particular, if it is assumed that there is enough buffering (say 100 buffers) to avoid excessive dropping of packets because the buffers have filled. Further, it is assumed in the example that for the Ethernet traffic there is a soft deadline of x units of time before which an incoming packet must be serviced. The worst-case latency for an incoming packet from the Ethernet can then be calculated. When a first packet is received and the buffers are not occupied, the latency for the packet is 27 time slots. The worst case for latency occurs when a packet of interest occupies the 100th buffer, and the latency is 27*100 slots. If this latency is too high, one of two design changes may be made: (a) reducing the amount of buffering for Ethernet packets so that if the guaranteed worst-case latency cannot be met, the packet is dropped, or (b) increasing the relative weight for Ethernet processing as compared to the weights of the other threads. The latter change can be effected by processing multiple packets for each time that the thread is invoked, or, if one is interested in a finer granularity of response time, by distributing the Ethernet thread schedule over multiple points in the round-robin schedule of the thread scheduler.

The foregoing example has, for simplicity, omitted any accounting for the general purpose thread, which occupies an additional time slot in the round-robin schedule of the thread scheduler.

To some extent, latency issues can be used to determine the appropriate thread weights. For example, if there are no latency bounds of concern, and the system provides a lot of buffering in the lower layers, then the design could put all the work of multiple layers, such as the datalink layer, the network layer, and possibly the transport layer, into one real time processing thread. This would minimize the amount of context switching needed to process a single packet. On the other hand, if latency is of concern, or if packet loss is a significant issue, the goal should be to have the work of processing a packet broken up into multiple real time threads. The work of minimizing packet loss may be put in the first real time thread, which is given a weight of multiple units of work. Each unit of work is a small amount and does not impact latency, but moves the packet into an area having a relatively large amount of buffering. Processing in higher layers is then performed in a different real time thread. In any event, the division of work into multiple threads and the selection of weights (minimum non-preemptable processing times) for the threads, is a design process that depends largely on the available hardware, particularly buffering, and on the nature of the network and the design goals, such as minimizing latency and packet loss, and fairness of processing various tasks.

Regardless of how these design parameters are selected, an important aspect of the invention is that the real time threads, in general, do not run to "completion," unlike an interrupt-based system. In the context of this invention, not running to "completion" means either (a) in the case of processing a list or queue of items, not continuing to retain control until the entire queue is emptied, or (b) in the case of a single long task, not completing the task before relinquishing control. Because the real time threads are limited in this manner, the possibility of a receive livelock condition is practically eliminated. As a consequence, starvation of transmit operations is also a very low probability. And with appropriate choices of real time threads and their weights, packet loss and latency can be kept to an acceptably low level.

The file server used as an illustration in this specification poses additional considerations. The file server may still use disk interrupts in processing its disk reading and writing activities, in an effort to guarantee low latency for the file server functions. However, all of the disk input/output operations are initiated by real time or general purpose processing threads, and it is possible to impose requirements on the disk operations, such as limiting the rate of interrupts from the disk. The threads that schedule disk activity have knowledge of the file serving function that can be used to control the rate of interrupts and to ensure that the criteria of fairness of access to processing resources are satisfied.

The use of interrupts for processing disk input/output (I/O) allows the use of traditional mechanisms for processing disk I/O, which requires low latency for response to an interrupt. We may not have the time as required by a round robin schedule to process a disk interrupt. So if we do not want to have the disk subsystem take too much processing resources and thus defeat our fine grain control, we must control the rate of interrupts from the disk. This is achieved if all disk I/O's are issued from a real time thread such as received packet processing (or from a set of real time threads). These threads can then keep an account of how much disk I/O they have issued and account for the time spent in the disk interrupt service routine when accounting for the weight they assign for the real time thread. If the disk I/O was issued in an unsolicited fashion, we will not be able to account for the processing cycles expended for this work and thus our weight assignments would be wrong (because some of the processing cycles are unaccounted for). Also disk I/O cannot be put in the general purpose domain due to time constraints (deadlines).

A variant of the thread processing system described above uses a different scheme for invoking the threads. The use of a separate thread for each individual activity is very attractive only if the overhead for invoking and scheduling a thread is relatively small. Each switch to a different thread involves a switch in processing context and an associated overhead in invoking the new thread. In an alternative embodiment of the invention, threads are not scheduled but are invoked from real time service routines. The service routines must obey stringent rules to behave in a controlled fashion and to establish the necessary context for a newly called thread. For example, a thread to process receive packets typically begins by receiving a number of packets, and then completes their processing and delivers them to be used by another routine. Thus the routine does not have to recover any context, nor save it upon completion. In essence, the threads are invoked by procedure-specific calling routines, to avoid time consuming context switching that involves all context items.

It will be appreciated from the foregoing that the present invention represents a significant advance in the field of scheduling mechanisms for processors used in communication network stations. Use of the invention provides for improved performance of the system under normal load, and significantly superior performance under overload conditions. Specifically, the scheduling mechanism of the invention practically eliminates receive livelock conditions and starvation of transmits. Moreover, the technique can be optimized for a given system configuration and load conditions, to minimize latency and packet loss on reception. It will also be appreciated that, although an embodiment of the invention has been described in detail for purposes of illustration, various modifications may be made without departing from the spirit and scope of the invention. Accordingly, the invention should not be limited except as by the appended claims.

We claim:

1. A computer implemented method for scheduling multiple processing tasks in a network communication station, the method comprising the steps of:

establishing a plurality of processing threads, each of which is structured to execute for a respective limited time before being subject to preemption by another processing thread;

establishing at least one general purpose processing thread, wherein the general purpose processing thread is structured to execute for a preselected minimum time during which it is non preemptable by other threads, and to execute thereafter in a preemptable mode;

repeatedly determining when work of the processing tasks is to be done;

posting any determined work of the processing tasks to be done to appropriate ones of said plurality of processing threads;

selecting a processing thread that has work to be done;

executing said selected processing thread for said limited time, wherein a measure of said limited time is determined by counting a selected number of executed units of said selected processing thread; and repeating the selecting and executing steps for other processing threads.

2. A method as defined in claim 1, wherein the step of repeatedly determining when work of the processing tasks is to be done includes polling all of the processing tasks.

3. A method as defined in claim 1, wherein the step of repeatedly determining when work of the processing tasks is to be done includes:

enabling interrupts for higher priority processing tasks, said enabled interrupts temporarily preempting execution of said selected processing thread, said received interrupts indicating that work of the other processing tasks is to be done; and servicing each said interrupt by suspending execution of said selected processing thread and executing a thread associated with each said interrupt.

4. A method as defined in claim 1, wherein the step of establishing a plurality of processing threads includes:

establishing at least one real time processing thread for execution of time-critical functions, each real time processing thread being structured to execute for a time period determined by counting a maximum number of executed units of said real time processing thread.

5. A method as defined in claim 1, wherein:

the step of selecting a processing thread is performed on a round-robin basis; and the step of executing the selected thread includes switching the context of processing from the previously executing thread to the selected thread, and transferring processing control to the selected thread.

6. A method as defined in claim 4, wherein:

the step of selecting a processing thread includes selecting a thread on a round-robin basis from the real time and general purpose threads that have work posted; and the step of executing the selected thread includes switching the context of processing from the previously executing thread to the selected thread, and transferring processing control to the selected thread.

7. A method as defined in claim 1, wherein the step of posting any determined work of the processing tasks to be done to appropriate processing threads includes:

setting a posting flag for each processing thread that has work to be done; and said step of selecting further includes selecting from real time and general purpose threads which have posting flags.

8. A computer implemented method for scheduling multiple processing tasks in a network communication station, the method comprising the steps of:

establishing at least one real time processing thread, said real time processing thread structured to execute for a selected maximum time period, determined by counting a selected number of executed units of said real time processing thread; and establishing at least one general purpose processing thread, wherein the general purpose processing thread is structured to execute for a preselected minimum time during which it is non preemptable by other threads, and to execute thereafter in a preemptable mode.

9. The method as in claim 8, further comprising:

repeatedly determining when work of the processing tasks is to be done;

posting any determined work of the processing tasks to be done to appropriate ones of the processing threads;

selecting a processing thread that has work to be done;

executing the selected processing thread; and repeating the selecting and executing steps for other processing threads.

10. A method as defined in claim 9, wherein the step of repeatedly determining when work of the processing tasks is to be done includes polling all of the processing tasks.

11. A method as defined in claim 9, wherein the step of repeatedly determining when work of the processing tasks is to be done includes:

enabling interrupts for higher priority tasks, which temporarily preempt other processing; and deferring time consuming interrupt servicing functions for execution in processing threads.

12. A method as defined in claim 11, and further comprising the step of:

limiting the rate at which interrupts can be serviced by temporarily disabling interrupts from time to time.

13. A method as defined in claim 9, wherein:

said at least one real time processing thread is selected for execution of time-critical functions; and the at least one general purpose processing thread is selected for execution of not time-critical functions.

14. A method as defined in claim 9, wherein:

the step of selecting a processing thread includes selecting a thread on a round-robin basis from the real time and general purpose threads that have work posted; and the step of executing the selected thread includes switching the context of processing from the previously executing thread to the selected thread, and transferring processing control to the selected thread.

15. A method as defined in claim 9, wherein the step of posting any determined work of the processing tasks to be done to appropriate processing threads includes:

setting a posting flag for each processing thread that has work to be done; and said step of selecting a processing thread further includes selecting from threads which have posting flags.

16. Apparatus for scheduling multiple processing tasks in a network communication station, the apparatus comprising:

a set of executable processing threads, including at least one real time processing thread having a plurality of thread units, said at least one real time processing thread structured to execute for a selected maximum time period determined by counting a selected number of executed units of said real time processing thread, and at least one general purpose processing thread structured to execute in a non-preemptable mode for a selected minimum time;

a thread posting mechanism repeatedly determining when work of the processing tasks is to be done by any of the processing threads, said thread posting mechanism posting any determined work to be done to appropriate ones of the processing threads; and a thread scheduler selecting processing threads that have work to be done, said thread scheduler allowing selected real time processing threads to execute for said selected maximum time and allowing said general purpose thread to execute in a non-preemptable mode for said selected minimum time, and to return said general purpose thread to preemptable upon expiration of said minimum time.

17. Apparatus as defined in claim 16, wherein the thread posting mechanism includes:

means for polling all of the processing tasks.

18. Apparatus as defined in claim 16, wherein the thread posting mechanism includes:

an interrupt system capable of temporarily preempting processing when a processing task has work to be done; and minimal interrupt servicing means, for rapid processing of interrupts, wherein time consuming interrupt servicing functions are deferred for execution in processing threads.

19. Apparatus as defined in claim 16, wherein:

said at least one real time processing thread is selected for execution of time-critical functions; and the at least one general purpose processing thread is selected for execution of not time-critical functions.

20. Apparatus as defined in claim 16, wherein the thread scheduler includes:

means for selecting a thread on a round-robin basis from the real time and general purpose threads that have work posted; and means for executing the selected thread by switching the context of processing from the previously executing thread to the selected thread, and transferring processing control to the selected thread.

21. Apparatus as defined in claim 16, wherein the means for posting any determined work to be done to appropriate processing threads includes:

means for setting a posting flag for each processing thread that has work to be done.

\* \* \* \* \*